(12) United States Patent
Naito

(10) Patent No.: US 10,742,963 B2
(45) Date of Patent: Aug. 11, 2020

(54) IMAGE CAPTURING APPARATUS, CONTROL METHOD FOR THE SAME, AND COMPUTER READABLE MEDIUM

(71) Applicant: CANON KABUSHIKI KAISHA, Tokyo (JP)

(72) Inventor: Go Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 15/340,354

(22) Filed: Nov. 1, 2016

(65) Prior Publication Data

US 2017/0134716 A1 May 11, 2017

(30) Foreign Application Priority Data

Nov. 6, 2015 (JP) .................................. 2015-218792

(51) Int. Cl.
| | | |
|---|---|---|
| *H04N 5/232* | (2006.01) | |
| *B29C 67/00* | (2017.01) | |
| *B33Y 50/02* | (2015.01) | |
| *B33Y 30/00* | (2015.01) | |
| *H04N 13/296* | (2018.01) | |
| *H04N 13/225* | (2018.01) | |
| *B33Y 50/00* | (2015.01) | |
| *H04N 13/232* | (2018.01) | |
| *H04N 13/00* | (2018.01) | |

(52) U.S. Cl.
CPC ............ *H04N 13/296* (2018.05); *B33Y 30/00* (2014.12); *B33Y 50/00* (2014.12); *B33Y 50/02* (2014.12); *H04N 5/23293* (2013.01); *H04N 13/225* (2018.05); *H04N 13/232* (2018.05); *H04N 2013/0081* (2013.01)

(58) Field of Classification Search
None
See application file for complete search history.

(56) References Cited

U.S. PATENT DOCUMENTS

2003/0067609 A1* 4/2003 Morita ............... G01B 11/2441
356/512
2006/0072175 A1* 4/2006 Oshino ................... G06T 15/10
358/537

(Continued)

FOREIGN PATENT DOCUMENTS

| | | | |
|---|---|---|---|
| JP | 2004-122501 A | | 4/2004 |
| JP | 2011-085971 A | | 4/2011 |
| WO | WO2010061799 | * | 3/2014 |

*Primary Examiner* — Frederick D Bailey
(74) *Attorney, Agent, or Firm* — Canon U.S.A., Inc. IP Division

(57) ABSTRACT

An image capturing apparatus includes an image sensing device, a first acquisition unit, a second acquisition unit, and a display control unit. The first acquisition unit acquires an image acquired by using the image sensing device and three-dimensional information regarding a subject in the image. The three-dimensional information includes depth information regarding the image. The second acquisition unit acquires a shaping resolution indicating a resolution used by a shaping device to shape an object in a three-dimensional shape of the subject. The display control unit displays, based on the shaping resolution and the three-dimensional information regarding the subject, a relationship between a size of the subject and magnitude of the shaping resolution.

13 Claims, 13 Drawing Sheets

(56) References Cited

U.S. PATENT DOCUMENTS

| | | | | |
|---|---|---|---|---|
| 2008/0122835 | A1* | 5/2008 | Falco, Jr. | G06T 19/20 345/419 |
| 2010/0039466 | A1* | 2/2010 | Takahashi | B41J 2/15 347/12 |
| 2011/0149041 | A1* | 6/2011 | Eccles | H04N 13/004 348/46 |
| 2012/0019635 | A1* | 1/2012 | Jian | H04N 3/0011 348/54 |
| 2013/0321441 | A1* | 12/2013 | Pahwa | G09G 5/00 345/582 |
| 2014/0063269 | A1* | 3/2014 | Krig | H04N 5/23203 348/207.1 |
| 2015/0055085 | A1* | 2/2015 | Fonte | G06F 16/22 351/178 |
| 2015/0277811 | A1* | 10/2015 | Lee | B29C 67/0088 358/1.15 |
| 2015/0310604 | A1* | 10/2015 | Lim | G06T 7/0004 382/141 |
| 2016/0129636 | A1* | 5/2016 | Cudak | G05B 15/02 700/97 |
| 2017/0032580 | A1* | 2/2017 | Hemani | G06T 19/20 |
| 2017/0060384 | A1* | 3/2017 | Baardse | G06F 3/04842 |
| 2017/0072637 | A1* | 3/2017 | Yanazume | B33Y 50/02 |

\* cited by examiner

FIG. 3A
FIG. 3B
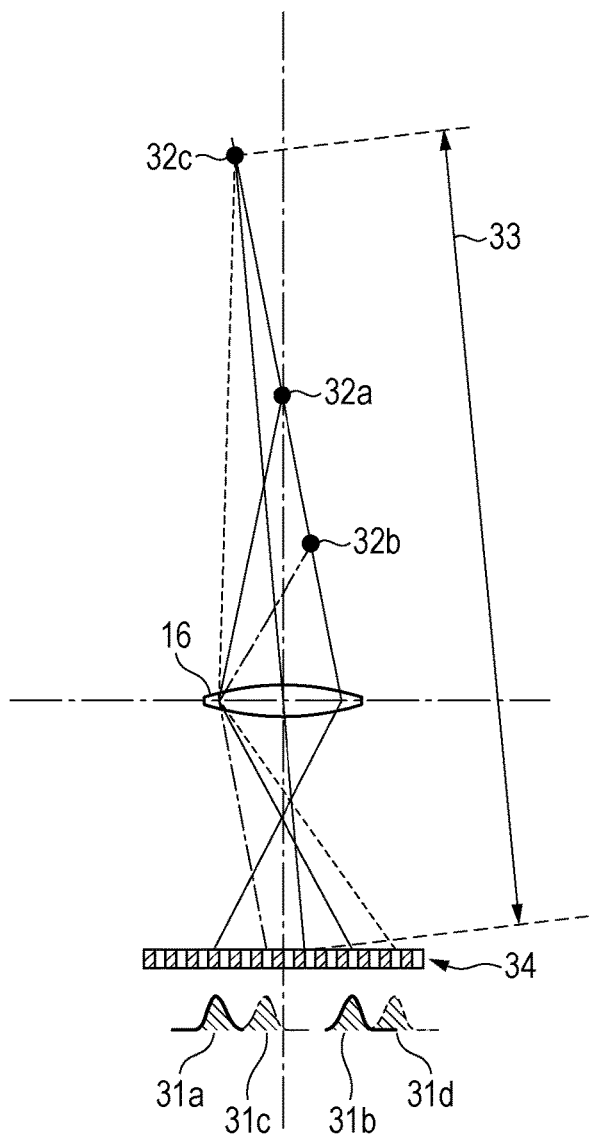
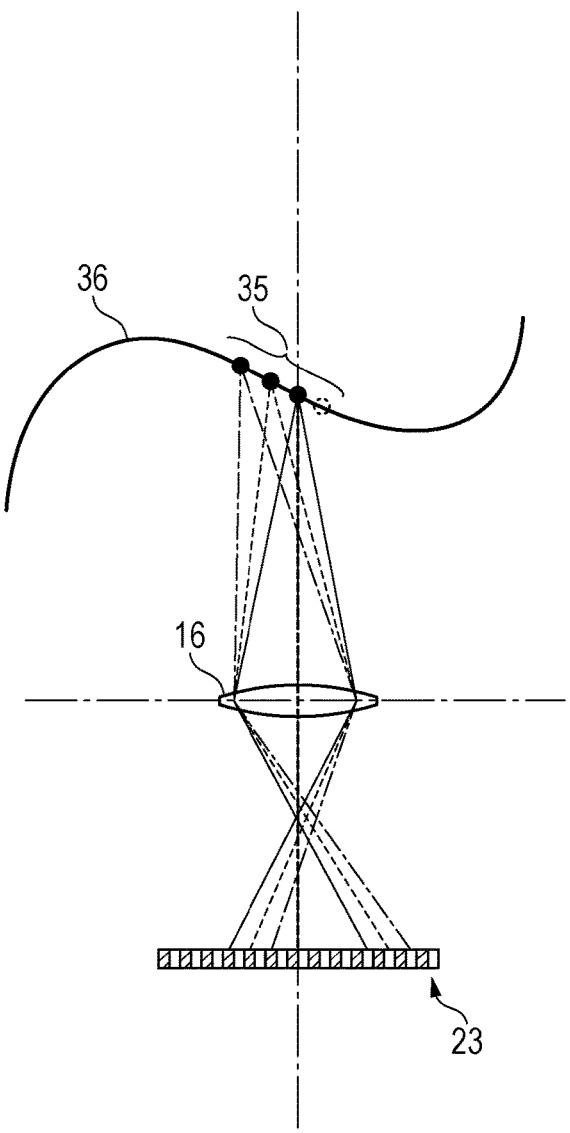

↓ SHAPED

↓ SHAPED

SHAPED ↓

SHAPED ↓

IMAGE CAPTURING APPARATUS, CONTROL METHOD FOR THE SAME, AND COMPUTER READABLE MEDIUM

BACKGROUND OF THE INVENTION

Field of the Invention

The present disclosure generally relates to image capturing and, more particularly, to an image capturing apparatus, a control method for the same, and a computer readable medium.

Description of the Related Art

Systems for estimating three-dimensional (3D) coordinates of a subject in a plurality of images taken at different positions using a camera are known. The 3D coordinates are estimated based on information regarding the positions of feature points that correspond to each other in the images and based on the positions and orientations of the camera (Japanese Patent Laid-Open No. 2011-85971).

Shaping devices for 3D objects commonly known as 3D printers are also known, and Japanese Patent Laid-Open No. 2004-122501 discloses an optical shaping device that shapes a 3D object by layering cured resin layers obtained by curing a photocurable resin by light exposure.

To date, no image capturing apparatus enabling appropriate shaping of a 3D object by using such a shaping device as described in Japanese Patent Laid-Open No. 2004-122501 and 3D coordinate data (also referred to as 3D information) regarding a subject acquired by such a method as disclosed in Japanese Patent Laid-Open No. 2011-85971 has been disclosed.

SUMMARY OF THE INVENTION

An image capturing apparatus according to an exemplary embodiment of the disclosure includes, for example, an image sensing device, an image, a first acquisition unit, a second acquisition unit, and a display control unit. The first acquisition unit acquires an image acquired by using the image sensing device and three-dimensional information regarding a subject in the image. The three-dimensional information includes depth information regarding the image. The second acquisition unit acquires a shaping resolution indicating a resolution used by a shaping device to shape an object in a three-dimensional shape of the subject. The display control unit displays, based on the shaping resolution and the three-dimensional information regarding the subject, a relationship between a size of the subject and magnitude of the shaping resolution.

Further features of the present disclosure will become apparent from the following description of exemplary embodiments with reference to the attached drawings.

BRIEF DESCRIPTION OF THE DRAWINGS

FIGS. 3A and 3B are diagrams explaining a method for calculating a distance to a subject according to the exemplary embodiment.

DESCRIPTION OF THE EMBODIMENTS

Various exemplary embodiments, features, and aspects of the disclosure will be described in detail below with reference to the drawings.

To shape a 3D object by using such a shaping device as described in Japanese Patent Laid-Open No. 2004-122501 and 3D coordinate data (also referred to as 3D information) regarding a subject acquired by such a method as disclosed in Japanese Patent Laid-Open No. 2011-85971, a difference in resolution between the 3D information and the shaping device is to be addressed.

For example, if the resolution in the 3D information is lower than the resolution of the shaping device (hereinafter, referred to as shaping device resolution), the performance of the shaping device is not fully utilized. In contrast, if the resolution in the 3D information is higher than the shaping device resolution, an object is obtained with only low 3D information reproducibility. In addition, since more 3D information than necessary is processed, resources such as memory capacity and throughput are wastefully consumed.

In particular, consider a case where a 3D object is shaped in such a manner that 3D information is acquired using an image capturing apparatus and input to a shaping device. In this case, it is desirable that when taking an image with the image capturing apparatus, a user of the image capturing apparatus know whether the resolution in the acquired 3D information has an appropriate relationship with the shaping device resolution.

Under these circumstances, the present disclosure provides an image capturing apparatus, a control method for the same, and a non-transitory computer readable medium that are enabled to assist in the generation of desired 3D information for shaping an object.

First Exemplary Embodiment

Hereinafter, an exemplary embodiment of the disclosure will be described in detail with reference to the drawings. A digital camera that can generate 3D information by using a captured image is taken as an example of an image capturing apparatus in the following description, and an example in which the exemplary embodiment is applied to the digital camera will be described. The exemplary embodiment, however, is not limited to the digital camera and is applicable to any electronic device that can generate 3D information by using a captured image. Examples of these electronic devices may include a mobile phone, a gaming machine, a tablet terminal, a watch or glass information terminal, and a medical device.

Configuration of Camera 1

Figure 1A:
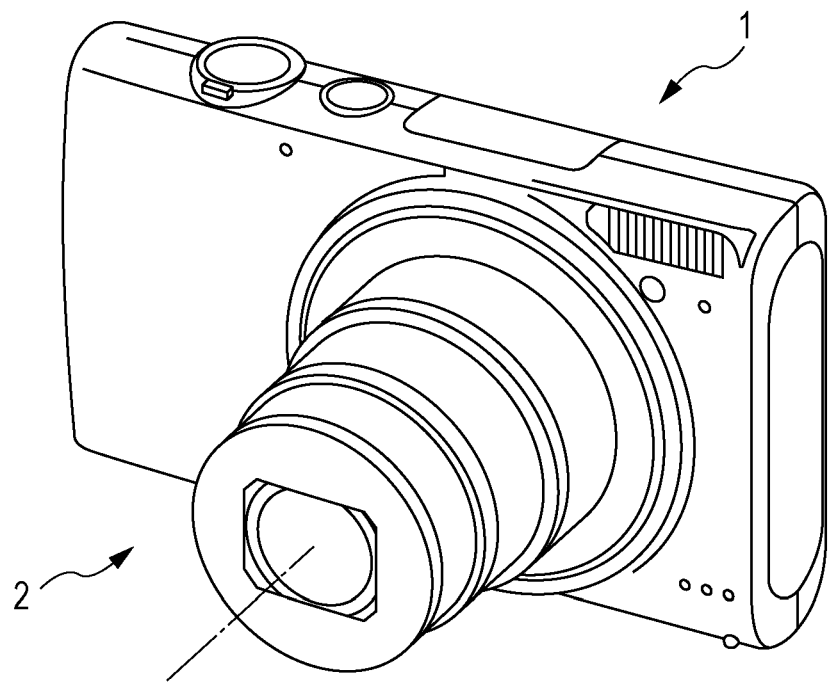
FIGS. 1A and 1B are perspective diagrams of a digital camera taken as an example of an image capturing apparatus according to an exemplary embodiment of the disclosure.
Figure 1B:
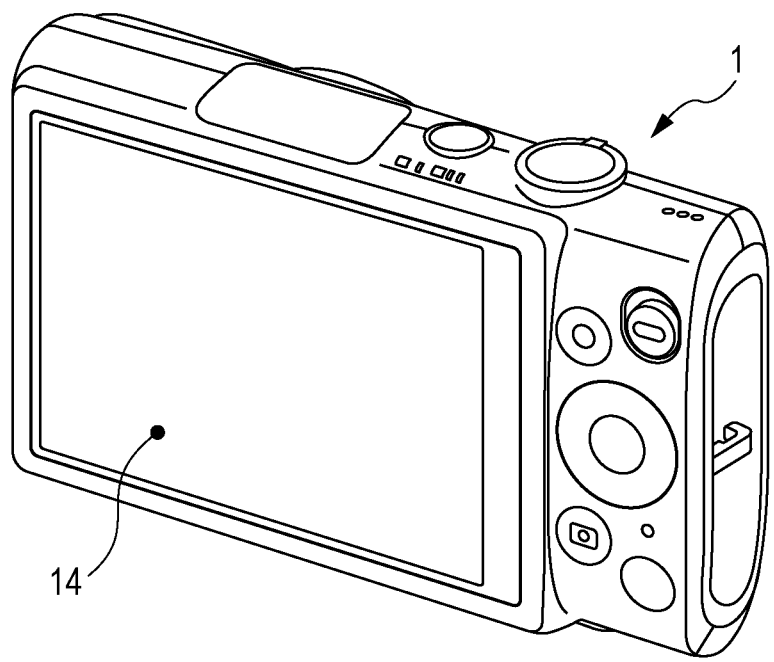
Figure 1C:
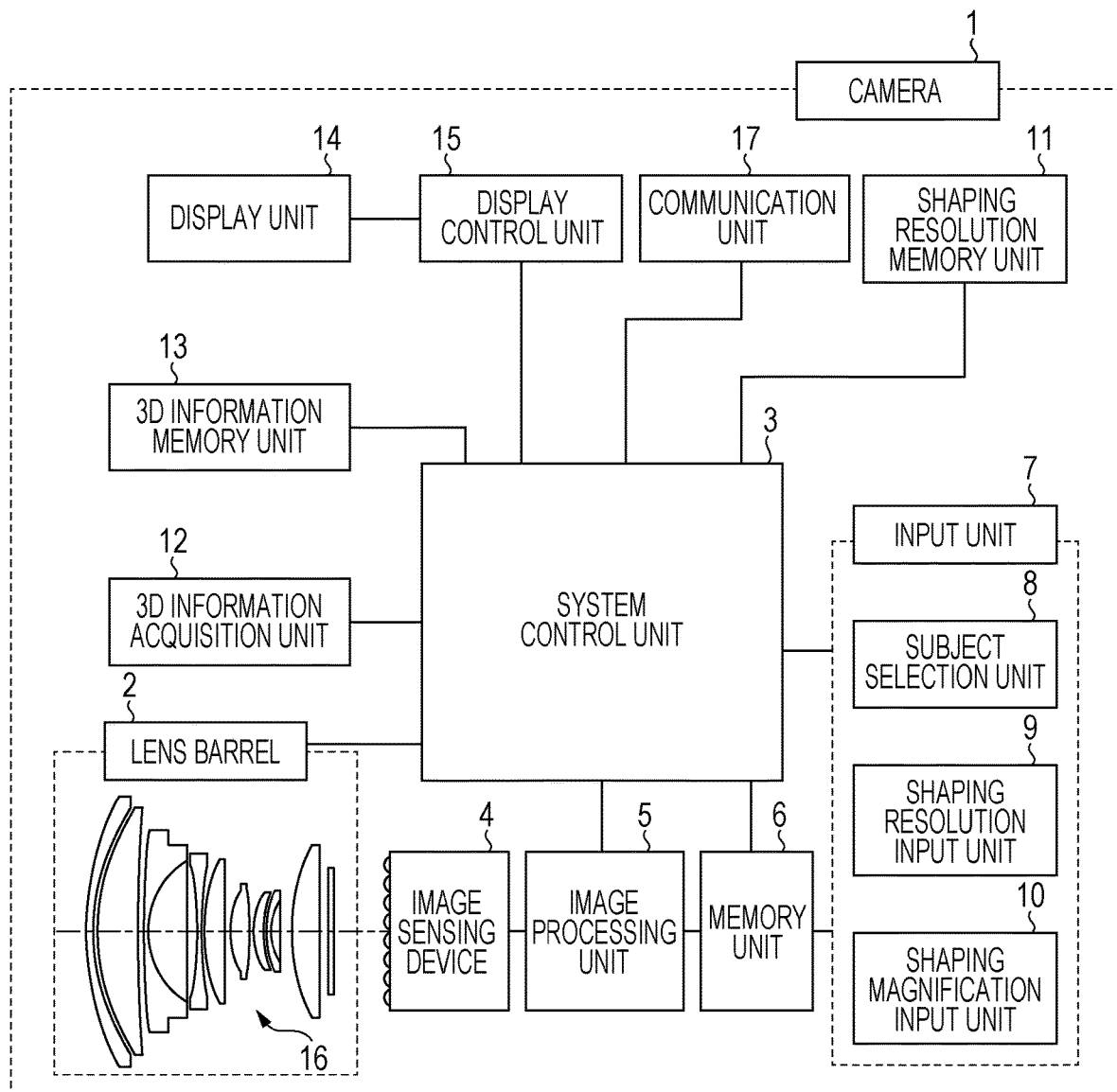
FIG. 1C is a block diagram illustrating an example functional configuration of the digital camera.

FIGS. 1A and 1B are perspective diagrams of a digital camera (simply referred to as a camera) 1 taken as an example of the exemplary embodiment, and FIG. 1C is a block diagram illustrating an example functional configuration of the camera 1. One or more of the functional blocks illustrated in FIG. 1C may be implemented by hardware such as an application specific integrated circuit (ASIC) or a programmable logic array (PLA), software executed by a programmable processor such as a central processing unit (CPU) or a microprocessor unit (MPU), or a combination of the software and the hardware. Accordingly, even though operations are respectively performed by different functional blocks in the following description, the operations may be performed by the same hardware.

The camera 1 includes a lens barrel 2 including an imaging optical system 16 including a focus lens and other components. The lens barrel 2 may be detachable from the camera 1. A system control unit 3 includes, for example, a CPU or a MPU, which may include one or more processors and one or more memories, a nonvolatile memory, and a volatile memory. The system control unit 3 loads a program stored in the nonvolatile memory into a work area of the volatile memory and runs the program. The system control unit 3 thereby controls operations of the functional units and implements operations of the camera 1. As used herein, the term "unit" generally refers to hardware, firmware, software or other component, such as circuitry, alone or in combination thereof, that is used to effectuate a purpose.

An image sensing device 4 includes an array of pixels having a photoelectric conversion function and converts a subject image formed on an imaging plane by the imaging optical system 16 into an electrical signal (image signal). As described later, the image sensing device 4 contains the pixels each having a plurality of photoelectric conversion areas and can acquire a plurality of parallax images at a single time when photographing (exposure) is performed.

An image processing unit 5 applies various image processing operations to an image signal output by the image sensing device 4, a signal read by a memory unit 6, and other signals. Examples of the image processing operations applied by the image processing unit 5 include a white balance adjustment process, a color interpolation process, a gamma correction process, and encoding and decoding processes, but the image processing operations are not limited thereto.

The memory unit 6 includes, for example, at least one of the nonvolatile memory and the volatile memory and is used for temporarily storing data, saving various setting values, and the like. Programs run by the system control unit 3 may be at least partially stored in the memory unit 6, and the memory unit 6 may be used as a work area of the system control unit 3. The memory unit 6 may include a detachable storage medium, an interface, and a peripheral circuit. The interface and the peripheral circuit are used for writing data to the storage medium and reading out the data from the storage medium.

An input unit 7 is a user interface for a user of the camera 1 to input various instructions and data into the camera 1. The input unit 7 is not limited to a group of input devices involving physical operations such as keys, buttons, a switch, and a touch panel and may have a configuration for a contactless input such as audio input. The input unit 7 is provided with a subject selection unit 8 for selecting a subject in a captured image for shaping a 3D object, a shaping resolution input unit 9 for inputting a shaping resolution, and a shaping magnification input unit 10 for inputting a shaping magnification relative to the subject for the 3D object. These components may each be a dedicated input device but may be implemented by combination of, for example, an operation of a general-purpose input device included in the input unit 7 and display of a graphical user interface (GUI).

The shaping resolution indicates how precisely a shaping device (for example, a 3D printer) assumed to be used can shape a 3D object. For example, if a device can shape a 3D object at a pitch of 0.02 mm, the device has a shaping resolution of 0.02 mm. The shaping resolution may be determined based on the positional resolution of a shaping head of a used shaping device that discharges a material for shaping and on the diameter of a nozzle included in the shaping head. The shaping resolution may be input into the camera 1 by directly inputting a value or by another method such as by inputting the model number of the shaping device. In this case, pieces of information respectively identifying shaping devices (for example, the model numbers of devices) and shaping resolutions are stored in association with each other in the memory unit 6. The system control unit 3 refers to the memory unit 6 on the basis of a model number input from the input unit 7 and can thereby acquire the corresponding shaping resolution. The system control unit 3 stores the input shaping resolution or the acquired shaping resolution in a shaping resolution memory unit 11.

The shaping magnification is a value expressing the ratio of the size of a shaped object to the actual size of the subject. If the object does not involve deformation, a magnification in only one of directions x, y, and z may be designated. For example, if 2 is designated, an object to be shaped is eight times (=2^3) as large as the subject. A magnification in cubic volume may also be designated, as a matter of course. Alternatively, the magnification may automatically be set when the camera is started up or a subject for shaping is determined. Examples of a method for automatically determining a shaping magnification include a method that uses the actual size of the subject and the maximum shaping size set for a used shaping device and in which a magnification leading to generation of a maximum-size shaped object is calculated as a shaping magnification. The shaping magnification may also be obtained by using the size of a to-be-shaped object input by the user (such as "within 100×100× 100 mm") instead of the maximum shaping size.

Figure 12:
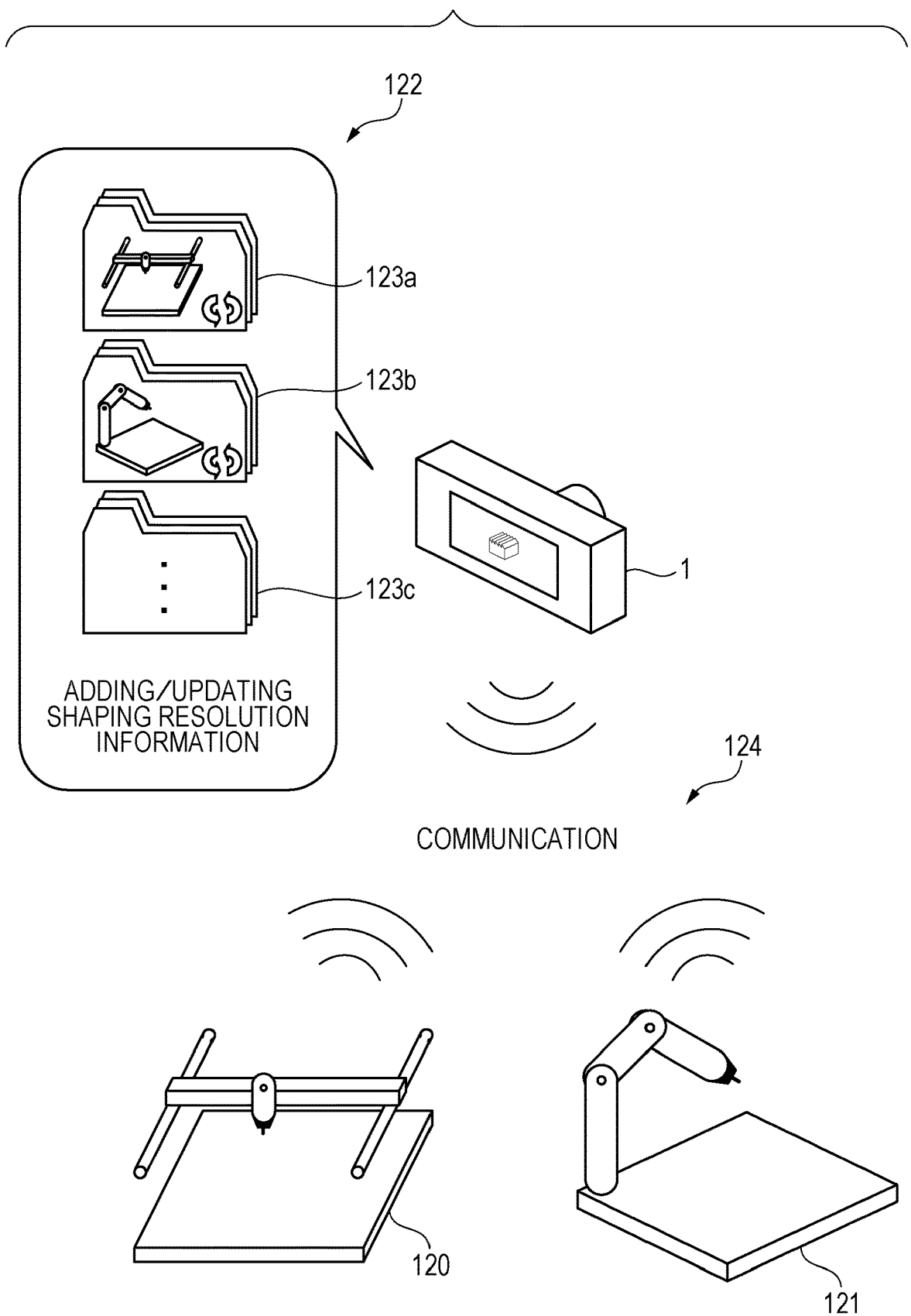
FIG. 12 is a diagram explaining adding and updating shaping resolution information according to the exemplary embodiment.

For example, as illustrated in FIG. 12, the camera 1 communicates with a shaping device 120 or a shaping device 121 through a communication unit 17 and can thus perform addition, update, and the like of the shaping device resolution to be stored in the shaping resolution memory unit 11. Reference numeral 124 denotes a communication path for the camera 1 to communicate, for example, wirelessly with the shaping device 120 or 121. Reference numeral 122 denotes a schematically illustrated interior of the shaping resolution memory unit 11. Reference numerals 123a, 123b, and 123c each denote information regarding a shaping resolution of the corresponding shaping device. The information regarding the shaping resolution is in advance stored, for example, in a form of a file in the shaping resolution memory unit 11. When the camera 1 establishes communication, for example, with the shaping device 120, the information regarding the shaping resolution for the shaping device 120 is updated. If the information regarding the shaping resolution for the shaping device 120 has not been stored in the shaping resolution memory unit 11, the information regarding the shaping resolution for the shaping device 120 is added.

Based on an image signal output by the image sensing device 4, a 3D information acquisition unit 12 acquires 3D information regarding a photographed subject (hereinafter referred to as 3D subject-information). A 3D information memory unit 13 stores therein the resolution in the 3D information acquired by the 3D information acquisition unit 12. The 3D subject-information in the exemplary embodiment is information obtained by combining a captured image (two-dimensional information) and range information regarding a distance from the camera 1 to the subject (depth information). The camera 1 in the exemplary embodiment can acquire a plurality of parallax images at a single time when photographing (exposure) is performed. Various cameras are known as such a camera, being represented by a multiple camera such as a stereo camera. In the exemplary embodiment, the image sensing device 4 has a micro lens array (hereinafter, a MLA) on the light receiving surface. The MLA is used to divide the exit pupil of the imaging optical system 16. A phase difference between the parallax images acquired by the image sensing device 4 is detected, and the subject range information (depth information) can thereby be acquired. In addition, since the parallax images are added, two-dimensional information regarding the subject can also be acquired. The detailed configuration of the image sensing device 4 and a detailed method for acquiring 3D subject-information from parallax images will be described later with reference to FIG. 2A to FIG. 3B.

The subject range information acquired by the 3D information acquisition unit 12 and a captured image (two-dimensional information) generated by the image processing unit 5 are stored in the memory unit 6 in combination with each other as 3D subject-information. The resolution in the acquired 3D information (referred to as an acquired resolution) is stored in the 3D information memory unit 13. The acquired resolution indicates the degree of preciseness of the 3D subject-information and also indicates the shortest distance between adjacent 3D coordinate points in the acquired 3D information.

A display unit 14 includes a display member using, for example, a liquid crystal display (LCD) panel or a light emitting diode (LED) panel and displays, for example, a menu screen for operating the camera 1 and photographed images in accordance with an instruction from a display control unit 15 that controls display on the display unit 14. Based on the 3D subject-information stored in the 3D information memory unit 13, the display unit 14 also displays a shaping device resolution stored in the shaping resolution memory unit 11 and a photographed image in comparison with each other.

The communication unit 17 is a communication interface between the camera 1 and an external device and enables communication between the camera 1 and the external device in at least one of wired and wireless manners. For example, when the camera 1 is connected to a shaping device or a server through the communication unit 17, for example, in a wireless local area network (LAN) format, the shaping resolution can be received, and 3D information regarding a subject for shaping can be transmitted to the shaping device or other devices.

Acquiring 3D Information

Figure 2A:
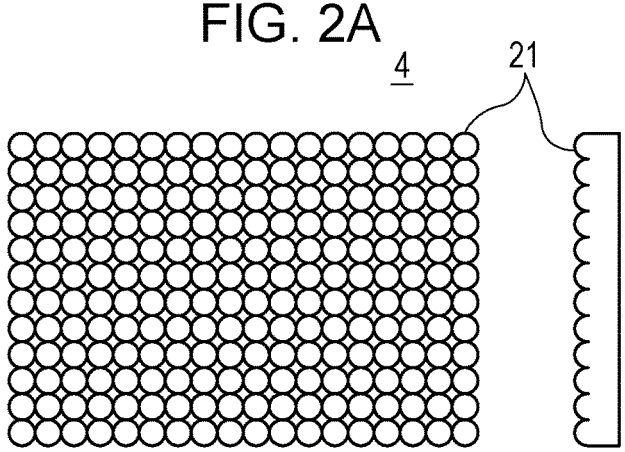
FIGS. 2A to 2G are diagrams explaining a 3D information calculation method according to the exemplary embodiment.
Figure 2B:
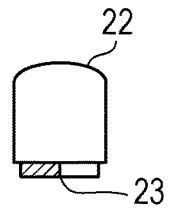
Figure 2C:
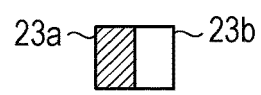

A method for acquiring 3D subject-information in the exemplary embodiment will be described. First, an example configuration of the image sensing device 4 will be described with reference to FIGS. 2A to 2D. FIG. 2A schematically illustrates the image sensing device 4 viewed from the front and the side of the camera 1. A pixel group 23 included in the image sensing device 4 has a MLA 21 on the light receiving surface of the pixel group 23. As illustrated in FIGS. 2B and 2C, pixels in the pixel group 23 each include a micro lens 22 and two photodiodes (photoelectric conversion areas) 23a and 23b. The photodiodes 23a and 23b are hereinafter referred to as an A-image photodiode (A-pixel) 23a and a B-image photodiode (B-pixel) 23b respectively.

Figure 2D:
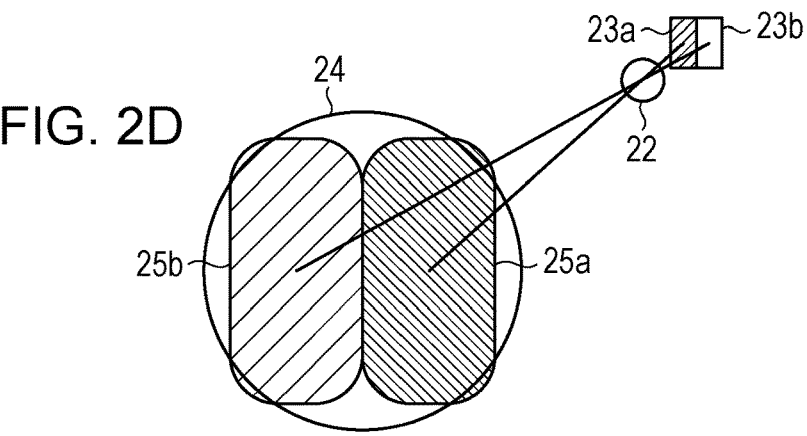

FIG. 2D conceptually illustrates an exit pupil 24 of the imaging optical system 16. An A-image pupil 25a and an A-pixel 23a are respectively conjugate with an A-image pupil 25b and a B-pixel 23b with the micro lens 22 interposed therebetween. Specifically, each pixel of the image sensing device 4 has a pupil-dividing function. A light beam passing through the A-image pupil 25a located in a right half of the exit pupil 24 enters the A-pixel 23a, while a light beam passing through the A-image pupil 25b located in a left half of the exit pupil 24 enters the B-pixel 23b. Accordingly, an image formed by the A-pixel group and an image formed by the B-pixel group are parallax images.

In a case where images respectively formed by image signals generated from the A-pixel and B-pixel groups in the pixels are respectively an A-image and a B-image, detecting an amount of defocusing between the A-image and the B-image enables detection of an amount and a direction of defocusing in the imaging optical system 16. This enables auto-focusing (AF) based on a phase-difference focus detection method by using signals output from the image sensing device 4.

Figure 2E:
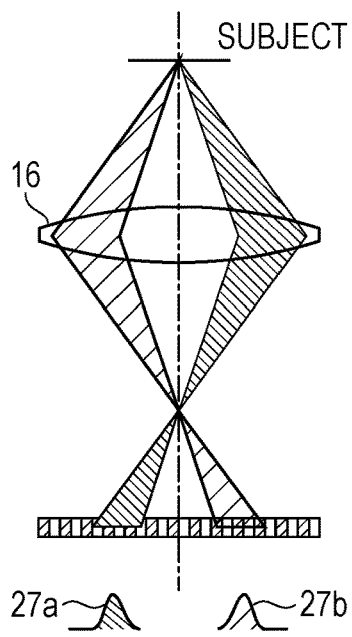
Figure 2F:
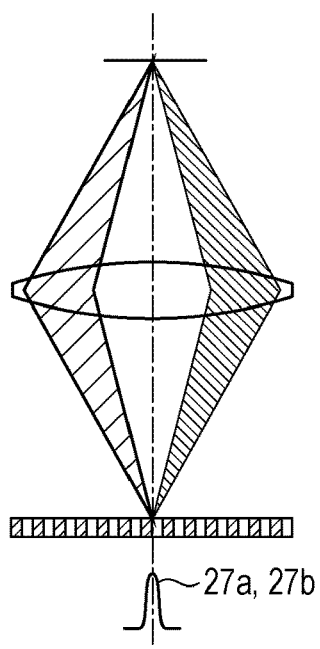
Figure 2G:
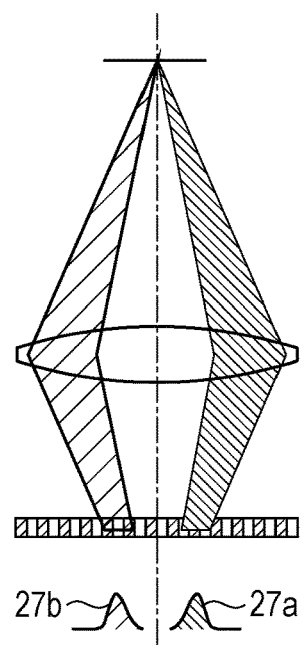

FIGS. 2E to 2G schematically illustrate the principle of focus detection performed in the phase-difference focus detection method. FIGS. 2E, 2F, and 2G respectively illustrate states where the focal points are in front of, at, and behind a subject. Reference numerals 27a and 27b respectively denote schematically illustrated A-image and B-image that are acquired from the pixel groups in the focusing areas set in the image sensing device 4. In FIG. 2F, there is no defocusing between the A-image 27a and the B-image 27b, and the subject is brought into focus. In FIG. 2E, the A-image 27a and the B-image 27b are away from the center and are located leftward and rightward of the center, respectively. In FIG. 2G, the A-image 27a and the B-image 27b are away from the center and are located rightward and leftward of the center, respectively. Range information regarding the subject can be acquired based on an amount of defocusing (defocusing amount) between the A-image and the B-image, a direction of defocusing from the center, a focal length of the imaging optical system 16, and a distance between the image sensing device 4 and the focus lens.

In the exemplary embodiment, the example in which each pixel includes the one micro lens 22 and the two photodiodes 23a and 23b has been described. However, more photodiodes may be used to acquire more parallax images having different base lengths, and the range information may thereby be acquired.

Calculating Subject Distance

A subject distance calculation method will be described by using FIGS. 3A and 3B. FIG. 3A schematically illustrates a method for calculating the position of a subject. Based on the focal length of the imaging optical system 16 and range information regarding a distance between the focus lens and the image sensing device 4, it is found that the light beam is deflected as illustrated by the solid line if an A-image 31a and a B-image 31b are obtained. Accordingly, it is found that if the subject is at a position 32a, the subject is brought into focus. Likewise, it is found that if a B-image 31c relative to the A-image 31a is obtained and if the subject is at a position 32b, the subject is brought into focus. It is also found that if a B-image 31d relative to the A-image 31a is obtained and if the subject is at a position 32c, the subject is brought into focus. As described above, the subject range information at the position of each pixel can be calculated based on a relative position between an A-image signal from the pixel and a B-image signal corresponding to the A-image signal.

The 3D subject-information may be stored not only by holding the A-image, the B-image, and information regarding the imaging optical system 16 at the time of photographing but also by holding subject range information. For example, if the A-image 31a and the B-image 31d are obtained in FIG. 3A, a distance 33 from a point on a pixel 34 to the position 32c is stored as the subject range information acquired from the pixel 34. The point on the pixel 34 is a midpoint corresponding to a half of the defocusing amount between the A-image 31a and the B-image 31d. In this manner, the subject range information can be held for each pixel. The range information may also be stored as a depth image.

FIG. 3B is a schematic diagram of projection, onto the subject, of the subject range information acquired by the 3D information acquisition unit 12 in such a manner as described with reference to FIG. 3A. FIG. 3B schematically illustrates, as a point cloud 36, points resulting from the projection of the acquired range information. Reference numeral 35 denotes the shape (a set of pieces of range information) of an actual surface of the subject. As described above, the 3D shape of the subject can be reproduced from the range information acquired by the 3D information acquisition unit 12. Actually, the subject is photographed in a plurality of directions, and pieces of 3D information acquired in the photographing are combined to acquire 3D information regarding the entire subject. However, if a subject has a lower surface considered to be horizontal, such as a building, the lower surface does not have to be photographed.

Relationship Between 3D Shaped Object and Shaping Resolution

Figure 4A:
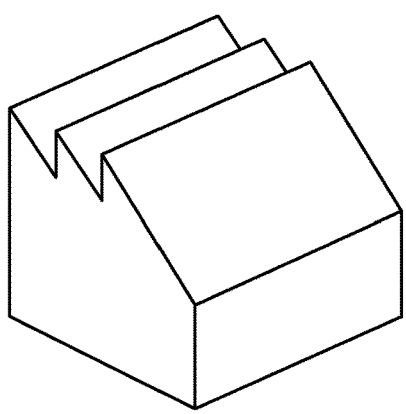
FIGS. 4A to 4F are diagrams schematically explaining a difference between objects three-dimensionally shaped in accordance with shaping resolutions.
Figure 4B:
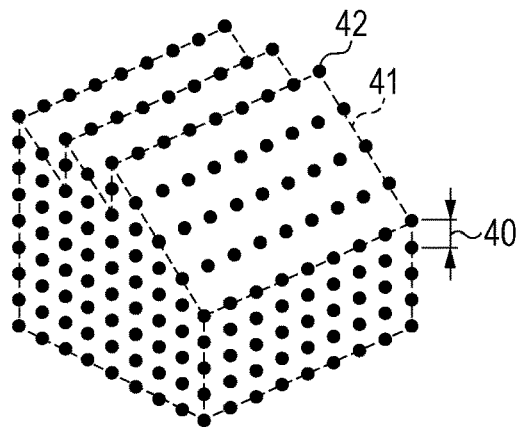

Subsequently, the influence of shaping device resolution on the shape of a 3D shaped object will be described by using FIGS. 4A to 4F. FIG. 4A illustrates a subject from which 3D information is to be acquired, and FIG. 4B schematically illustrates coordinates of 3D information acquired from an image of the subject in FIG. 4A taken with the camera 1. The outline of the subject is denoted by 41 using broken lines, coordinate points included in the 3D information are denoted by 42, and an acquired resolution in the 3D information is denoted by 40.

Figure 4C:
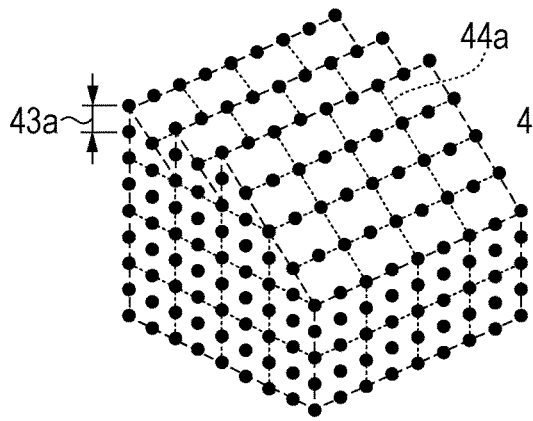
Figure 4D:
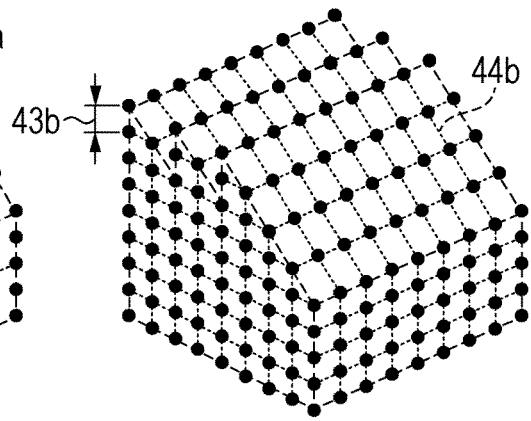

FIGS. 4C and 4D respectively illustrate shaping resolutions used for a shaping device A having a low shaping resolution and a shaping device B having a high shaping resolution. A shaping resolution 43a and a shaping resolution 43b are respectively used for the shaping device A and the shaping device B. Broken lines 44a and broken lines 44b schematically illustrate which of the coordinate points 42 in the 3D information are usable for shaping in the shaping resolutions respectively illustrated in FIGS. 4C and 4D. An object is herein shaped on the assumption that adjacent coordinate points in the 3D information are connected by lines. In FIG. 4C, the shaping resolution 43a is course, and the number of coordinate points (the number of coordinate points usable for the shaping) where the broken lines 44a intersect among the coordinate points 42 in the 3D information is smaller than the number of coordinate points where the broken lines 44b in FIG. 4D intersect. In other words, the shaping device B has more precise shaping ability than the shaping device A.

Figure 4E:
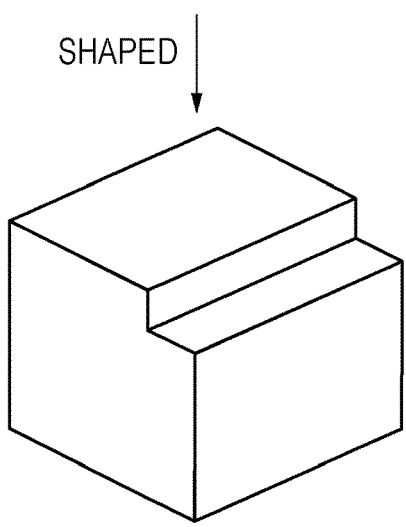
Figure 4F:
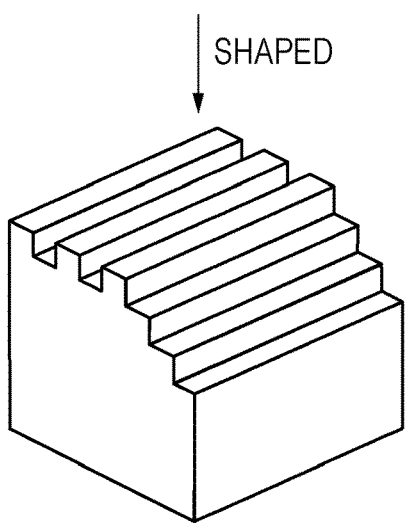

FIGS. 4E and 4F schematically illustrate objects three-dimensionally shaped with the shaping resolutions in FIGS. 4C and 4D, respectively. As clear from a comparison between FIGS. 4E and 4F, in an object shaped with a course shaping resolution, a sawtooth structure of the upper surface of the subject illustrated in FIG. 4A is reproduced with low reproducibility. As described above, even though similar pieces of 3D information are acquired, the use of different shaping resolutions leads to a difference in shape between details of 3D shaped objects. In this case, the use of a course shaping resolution allows the shape of the subject to be roughly reproduced but, in some cases, causes a failure in reproduction of the shape of details of the subject.

Figure 5A:
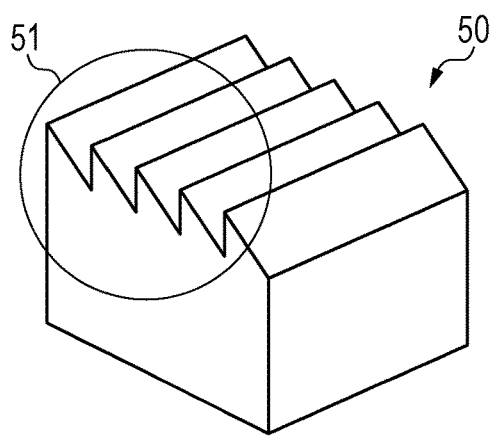
FIGS. 5A to 5D are diagrams schematically explaining a relationship between an acquired resolution and a shaping resolution according to the exemplary embodiment.
Figure 5B:
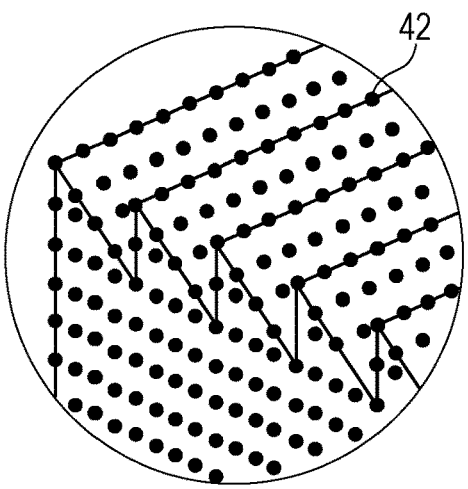

A relationship between a resolution acquired by the camera 1 and a shaping device resolution will be described by using FIGS. 5A to 5D. FIG. 5A illustrates a subject for shaping using a shaping device. FIG. 5B is an enlarged view of an upper portion 51 of a subject 50. Points 42 are coordinate points in 3D information in FIG. 5B.

Figure 5C:
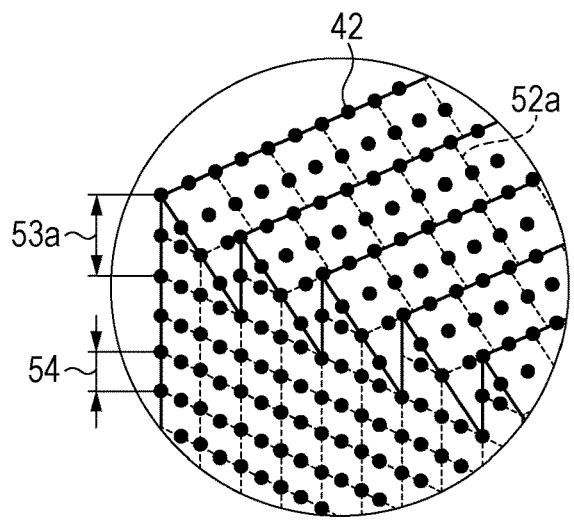
Figure 5D:
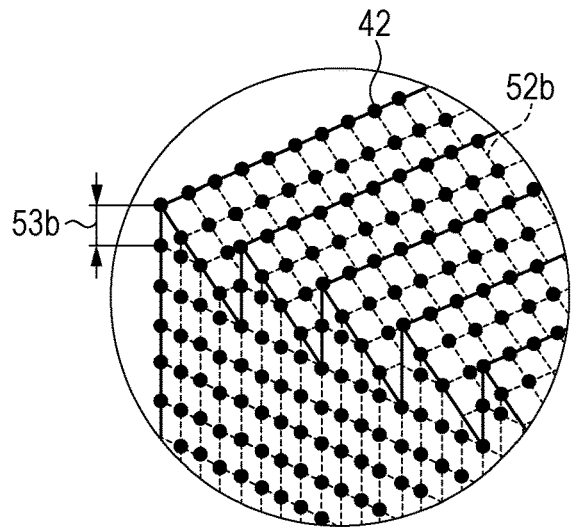

FIGS. 5C and 5D respectively illustrate states where different shaping resolutions for shaping devices are added to FIG. 5B. Each shaping resolution for the corresponding shaping device is schematically illustrated by using broken lines 52. The broken lines 52 are used for the minimum loci along which the corresponding shaping device can perform scanning for the shaping. Shaping resolutions are denoted by 53a and 53b each corresponding to a distance between the adjacent broken lines 52. Like FIG. 4C and FIG. 4D, FIG. 5C and FIG. 5D respectively illustrate the shaping resolution 53a that is a course shaping resolution and the shaping resolution 53b that is a precise shaping resolution. In FIG. 5C, the shaping resolution 53a of the shaping device is course compared with a distance between each adjacent two coordinate points in the 3D information (an acquired resolution 54). In FIG. 5D, the shaping resolution 53b is almost equal to the acquired resolution 54.

Figure 6A:
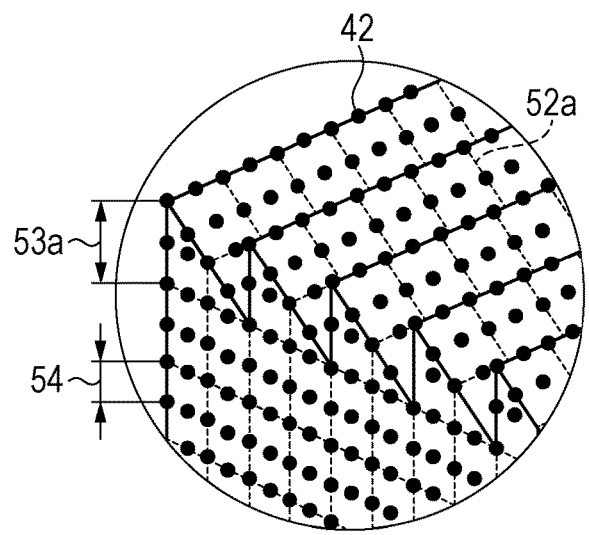
FIGS. 6A to 6D are diagrams schematically explaining the shapes of details of objects three-dimensionally shaped in accordance with shaping resolutions.
Figure 6B:
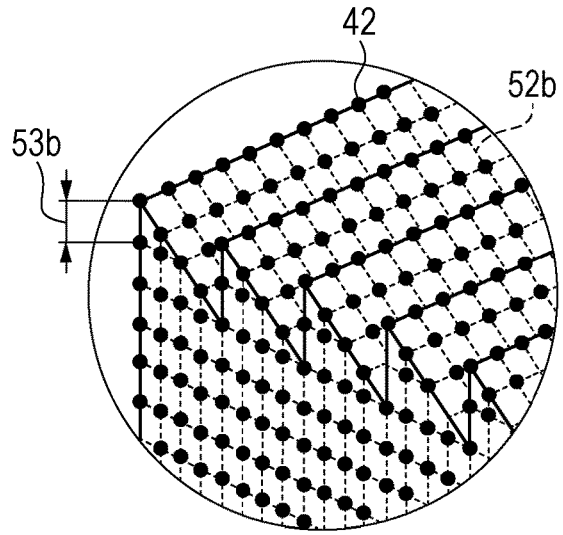

FIGS. 6A and 6B are the same as FIGS. 5C and 5D. Applying each shaping resolution to the 3D information as described above leads to corresponding one of the 3D objects respectively shaped as illustrated in FIGS. 6C and 6D.

Figure 6C:
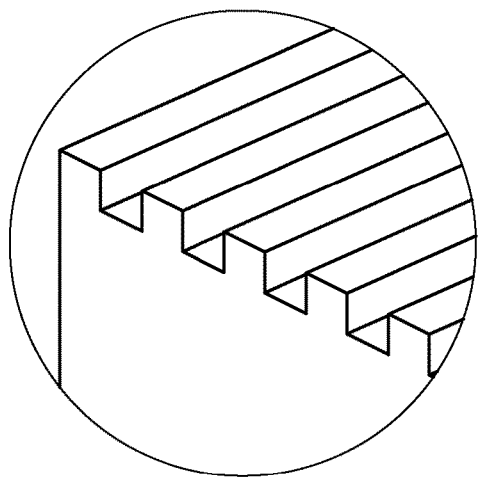
Figure 6D:
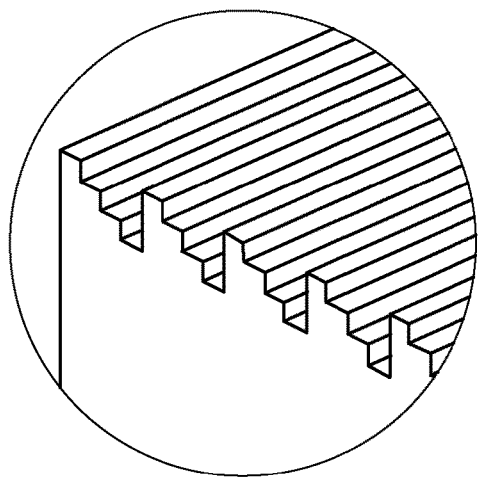

If the shaping resolution 53a is applied to 3D information, reproduction of the sawtooth shape of the upper portion 51 of the subject fails as illustrated in FIG. 6C. In contrast, if the shaping resolution 53b is applied to the 3D information, the sawtooth shape of the upper portion 51 of the subject can be reproduced as illustrated in FIG. 6D. As described above, even though the 3D information is successfully acquired, the shaping resolution lower than the acquired resolution may prevent reproduction of the shape of the subject. In particular, the user cannot know the influence of the shaping resolution (how the shaping resolution is applied to the subject for shaping) when acquiring the 3D information and thus cannot verify whether the subject is to be reproduced into a desired shape. The exemplary embodiment is designed such that when the user acquires 3D information, the user is notified of a shaping device resolution and can verify whether the shape of the subject is to be reproduced when a desired shaping device is used.

Example of Displaying Shaping Resolution on Display Unit 14

Figure 7A:
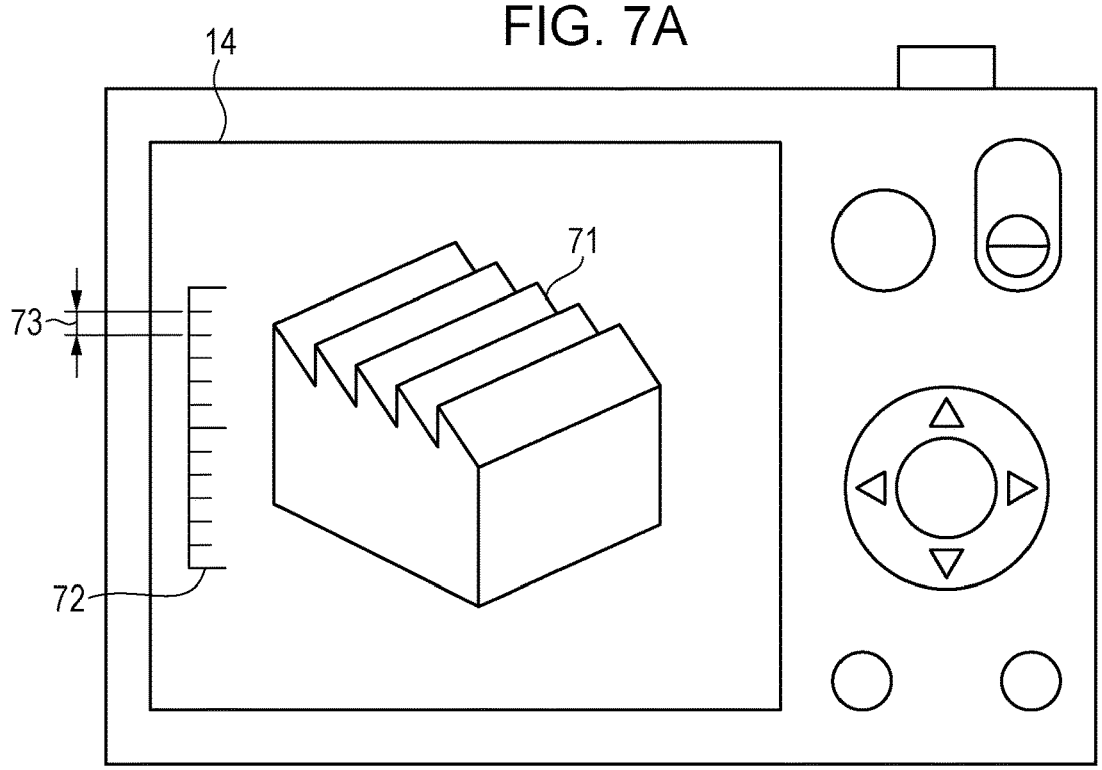
FIGS. 7A and 7B are each a diagram explaining an example of displaying a shaping resolution according to the exemplary embodiment.
Figure 7B:
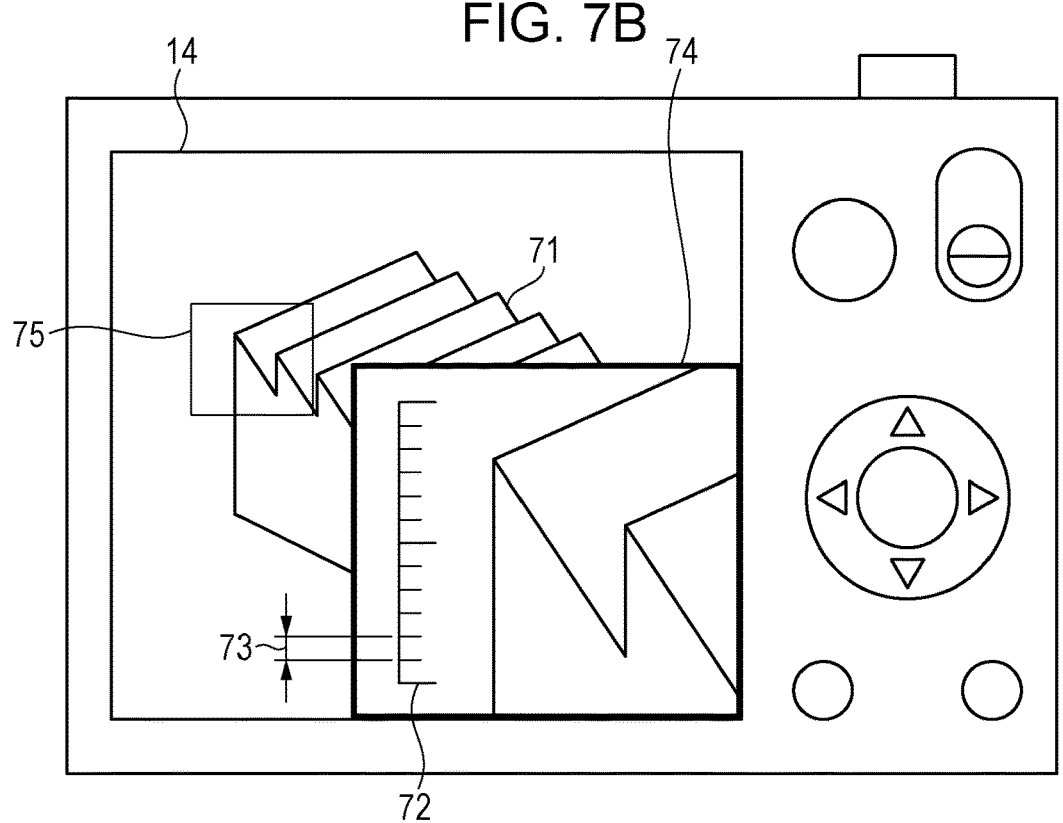

FIGS. 7A and 7B each illustrate an example of displaying a shaping device resolution on the display unit 14 of the camera 1. FIG. 7A illustrates an example of displaying a shaping resolution on a photographed image including a subject. FIG. 7B illustrates an example of displaying the shaping resolution on an image obtained by enlarging the photographed image. The display unit 14 displays a display scale 72 indicating a shaping resolution with the display scale 72 being superposed on, for example, a photographed image including a subject 71. The display scale 72 is an index indicating the magnitude of a shaping resolution used for shaping with 3D information acquired from the photographed image and indicates a relationship between the size of the subject and the magnitude of the shaping resolution. For example, each of divisions of the display scale 72 corresponds to a shaping resolution 73.

FIG. 7B illustrates an enlargement display 74 in which, for example, an image of enlarged part of the subject 71 is additionally displayed on a photographed image. Reference numeral 75 denotes a region of the photographed image to which enlargement display is applied. When the enlargement display 74 is displayed, the display unit 14 superposes the display scale 72 on the displayed enlargement display 74.

Adding the display scale 72 to a captured image as described above enables the user to know how a shaping resolution is applied to a subject (that is, the influence of the shaping resolution). In other words, the user can compare the magnitude of the shaping resolution with the size of the subject. The user can verify, at the time of photographing, whether a desired shape can be reproduced and can determine whether to take another image. The user can also determine how a shaping magnification (described later) is applied to the setting of a shaping device.

In addition, adding the display scale 72 to the enlargement display 74 enables the display scale 72 to be appropriately displayed relative to the size of a subject even when the shaping resolution 73 is high or low relative to the subject. That is, when a large subject is displayed, the display scale 72 may be relatively so small that the display scale 72 is unrecognized. The configuration prevents the display scale 72 from being unrecognized, and the user can easily know a relationship between the shaping resolution and the subject.

In the exemplary embodiment, the display scale 72 indicating the shaping resolution is superposed on the captured image or the enlarged image to notify the user of the shaping resolution. However, the displaying of the shaping resolution is not limited thereto. As long as the relationship between the shaping resolution and the subject is made known, the shaping resolution may be displayed by other display methods such as by using a numerical value, a marker, or a figure.

Applying Shaping Magnification

Figure 8A:
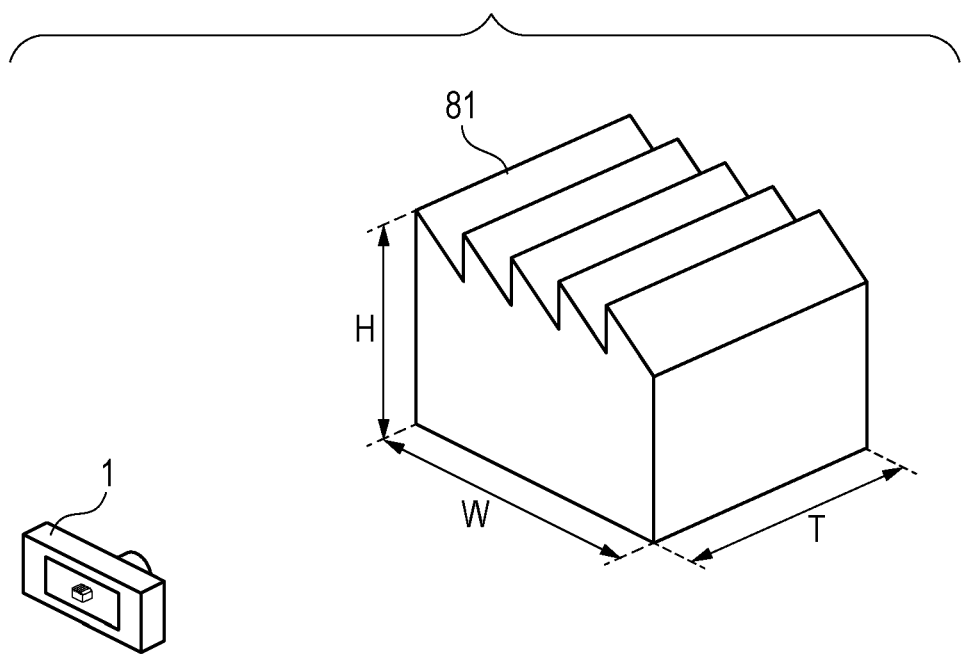
FIGS. 8A and 8B are diagrams schematically explaining a shaping magnification according to the exemplary embodiment.
Figure 8B:
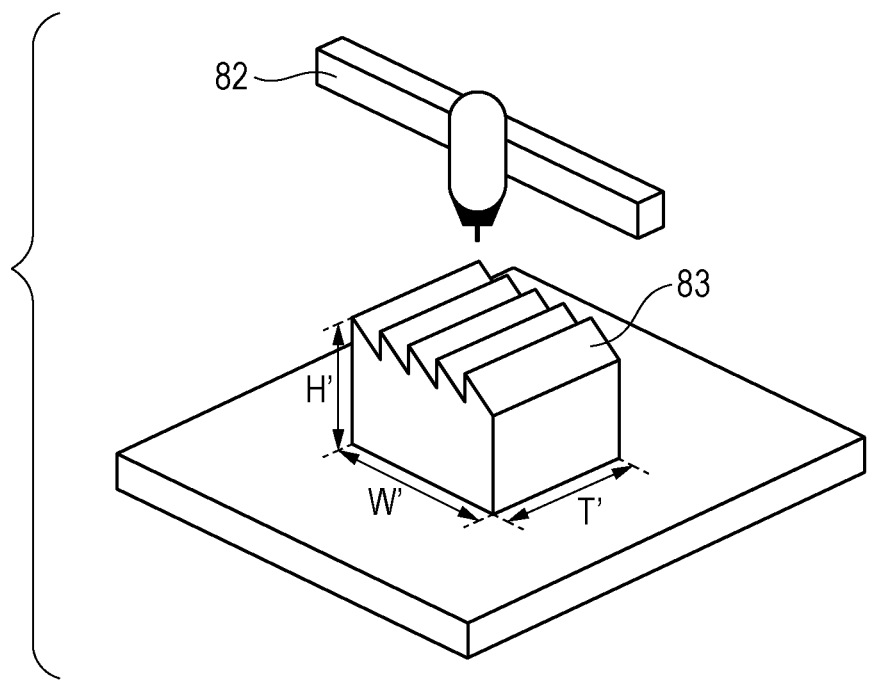

FIGS. 8A and 8B schematically and respectively illustrate a subject from which 3D information is acquired and a 3D shaped object generated using the acquired 3D information. In FIG. 8A, reference characters W, T, and H respectively denote dimensions of a subject 81 in horizontal, depth, and vertical directions. FIG. 8B illustrates a shaped object 83 generated by a shaping device 82 by using 3D information acquired from an image of the subject 81 taken using the camera 1. Reference characters W', T', and H' respectively denote dimensions in the horizontal, depth, and vertical directions.

In a case where a shaping magnification k is used for each direction, the dimensions W, T, and H of the subject have the following relationships with the dimensions W', T', and H'.

$$W \times k = W' \qquad (1)$$

$$T \times k = T' \qquad (2)$$

$$H \times k = H' \qquad (3)$$

If a life-size object is to be generated, the shaping magnification k=1 is used. Any value may be specified as the shaping magnification by the user by using the shaping magnification input unit 10, or the shaping magnification may be automatically set by the camera 1. For example, the actual dimensions of a photographed subject (W, T, and H in FIG. 8A) and the maximum size of an object to be generated by a used shaping device may be used to calculate and determine the shaping magnification. Alternatively, the user may input the dimensions of an object to be generated (for example, to obtain the longest side W' in FIG. 8B=100 mm), and the actual dimension of the subject in the width direction (W in FIG. 8A) may be used to calculate and determine the shaping magnification.

Figure 9A:
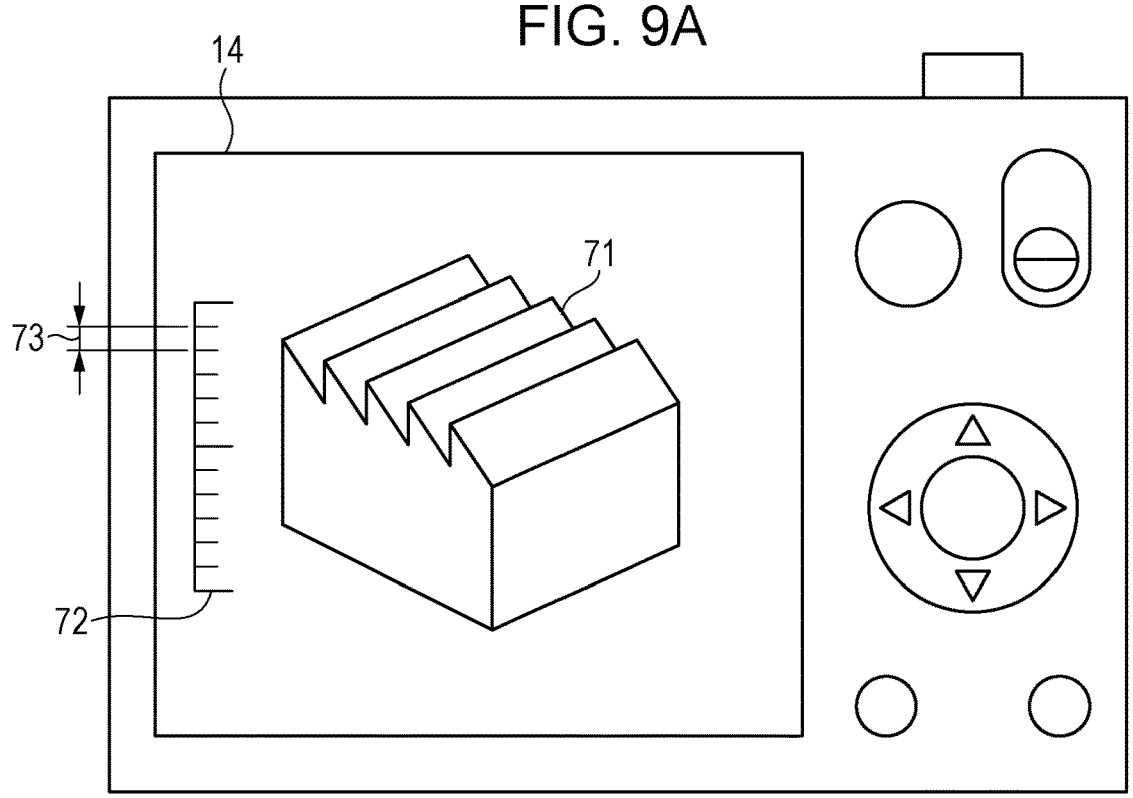
FIGS. 9A and 9B are each a diagram explaining an example of displaying a shaping resolution based on a shaping magnification according to the exemplary embodiment.
Figure 9B:
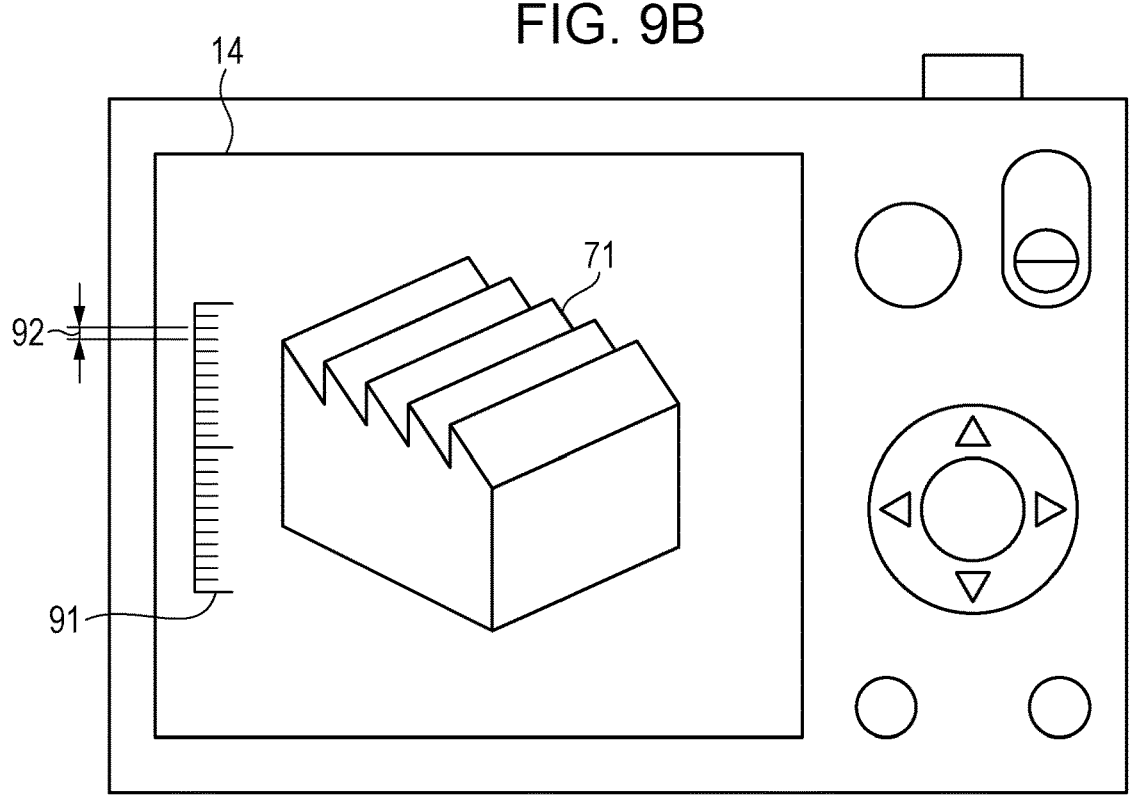

An example of displaying a shaping resolution on the basis of a shaping magnification will be described by using FIGS. 9A and 9B. If the shaping magnification k is considered (that is, k≠1), a shaping device resolution is changed relative to the shaping magnification k. FIG. 9A is the same as 7A and illustrates a case where the shaping magnification k is set at 1. In contrast, FIG. 9B illustrates a case where the shaping magnification k>1 (k=2 in FIG. 9B) is set to shape a 3D object larger than the actual subject. A display scale 91 indicates a shaping resolution with the shaping magnification k=2. For a shaping resolution 92, more precise divisions than those for the display scale 72 in FIG. 9A are displayed. That is, since a shaping magnification k larger than 1 leads to a generated object larger than the original, the shaping resolution 92 on the display scale 91 displayed on the display unit 14 is smaller than the shaping resolution 73 displayed in the case of shaping magnification k=1. For example, if the shaping magnification k=2 is set, the shaping resolution 92 is displayed in such a manner as to be half the size of the shaping resolution 73.

Figure 10A:
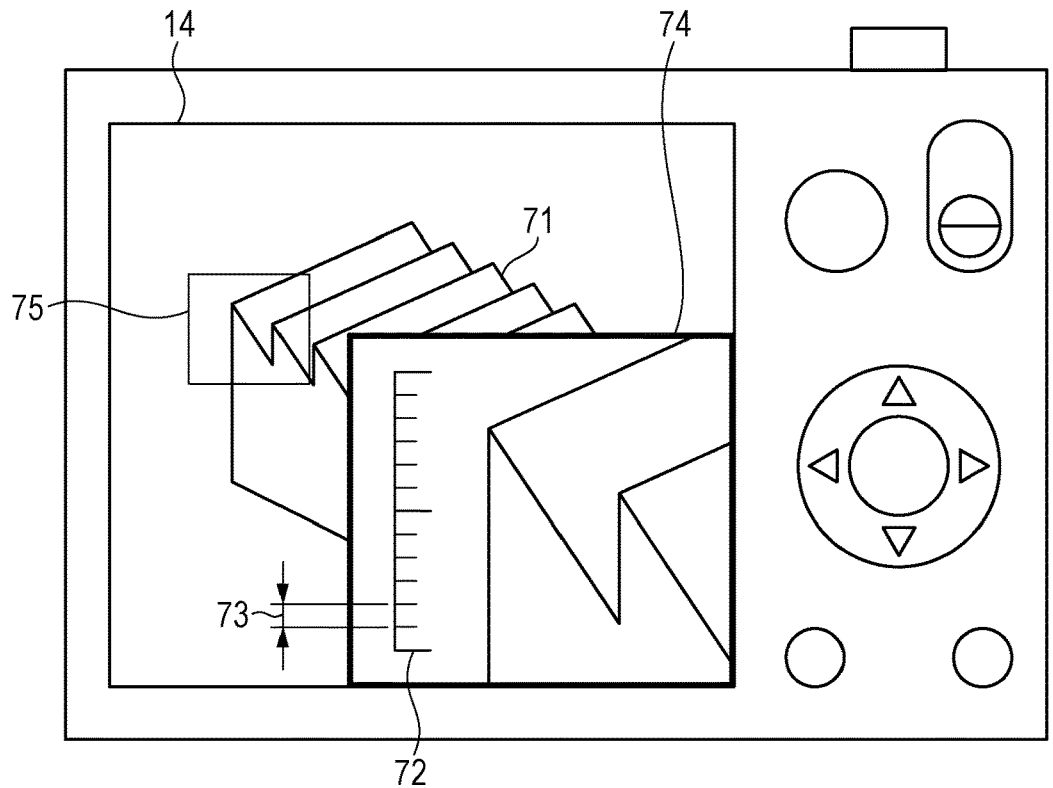
FIGS. 10A and 10B are each a diagram explaining example enlarged display of a shaping resolution according to the exemplary embodiment.
Figure 10B:
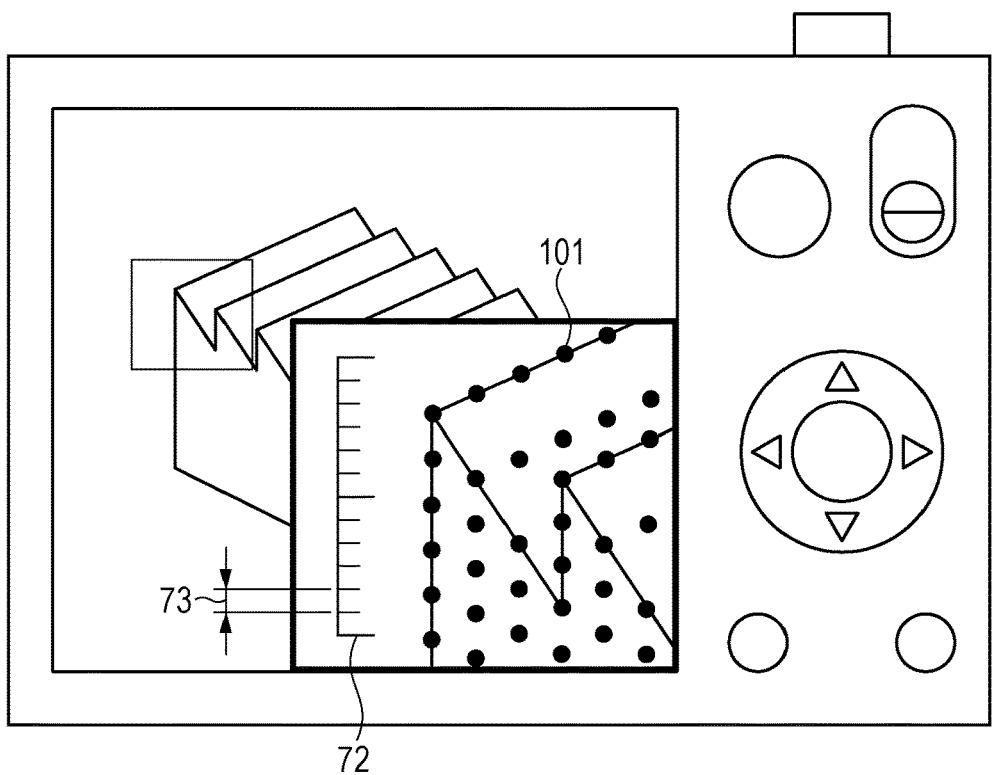

Further, an example of displaying a shaping resolution on an enlarged photographed image will be described by using FIGS. 10A and 10B. FIG. 10A is the same as FIG. 7B, and FIG. 10B illustrates an example of displaying 3D information acquired in photographing that is superposed on a region of the subject in FIG. 10A. Coordinate points in the 3D information are denoted by 101 like the coordinate points 42 in FIG. 4B. The coordinate points 101 in the 3D information, the display scale 72 indicating a shaping resolution, and the shaping resolution 73 are displayed simultaneously, and the user thus assumes shaping based on the 3D information and can verify a relationship between a shaping resolution and an acquired resolution in the 3D information (that is, an acquired state). For example, if the acquired resolution in the 3D information is courser than the shaping resolution, the user can determine that the user additionally acquires 3D information to shape a detailed object. In contrast, consider a case where a resolution in the 3D information equal to or more precise than the shaping resolution is acquired. In this case, even though additional 3D information is acquired, more precise shaping is not performed (due to shaping resolution restrictions). The user can thus determine that the user terminates photographing.

Series of Operations in Shaping Resolution Display Process

Figure 11:
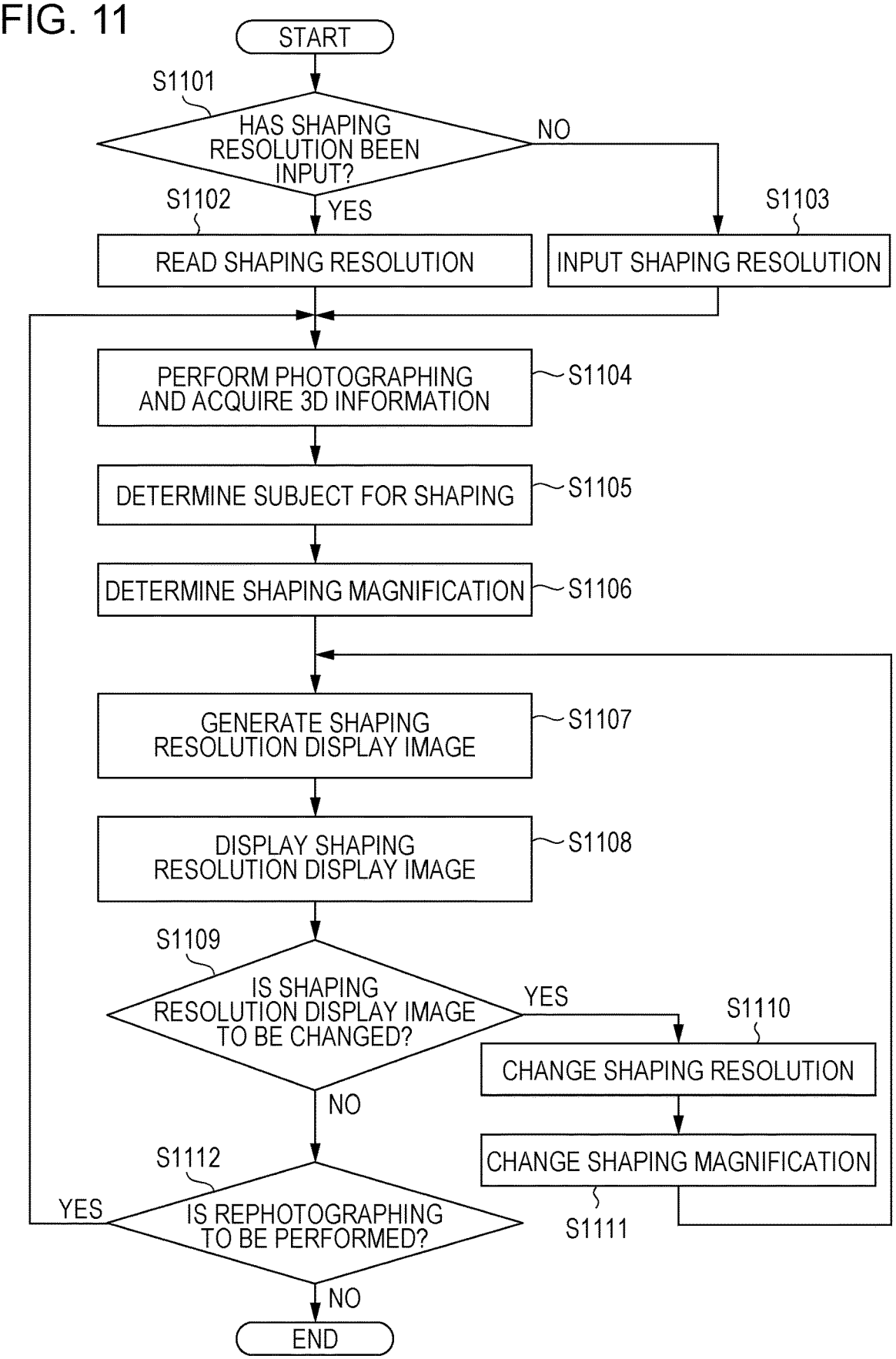
FIG. 11 is a flowchart illustrating a series of operations in a 3D-object shaping process according to the exemplary embodiment.

A series of operations in a process of acquiring 3D subject-information and displaying a shaping resolution on the display unit 14 (simply referred to as a resolution display process) will be described by using FIG. 11. The operations are performed, for example, when the user changes a photographing mode by using the input unit 7 to a photographing mode for acquiring 3D subject-information. The process is executed in such a manner that the system control unit 3 loads the program stored in the nonvolatile memory into the work area of the memory unit 6 and runs the program.

In S1101, the system control unit 3 determines whether a shaping resolution has been input. For example, if a shaping resolution has been stored in the shaping resolution memory unit 11, the system control unit 3 determines that the shaping resolution has been input and moves the process to S1102. If a shaping resolution has not been stored, the system control unit 3 determines that a shaping resolution has not been input and moves the process to S1103. Note that the shaping resolution is stored in the shaping resolution memory unit 11 after being input using, for example, the shaping resolution input unit 9 or being acquired through the communication unit 17.

In S1102, the system control unit 3 reads, from the shaping resolution memory unit 11, the shaping resolution input by the user with the shaping resolution input unit 9. In S1103, the system control unit 3 waits for inputting of a shaping resolution performed by the user by using the shaping resolution input unit 9. The shaping resolution may be input, for example, not only by directly inputting a value but also by inputting a value usable for specifying the value of the shaping resolution such as a model number of a shaping device. After the user inputs the shaping resolution, the system control unit 3 stores the input shaping resolution in the shaping resolution memory unit 11.

In S1104, the system control unit 3 waits for a photographing start instruction to be input by the user. The photographing start instruction may be input, for example, by fully pressing the shutter button on the input unit 7. When the photographing start instruction is input, the system control unit 3 performs exposure of the image sensing device 4, reads image signals, and generates a pair of parallax images. The system control unit 3 supplies the generated parallax images to the 3D information acquisition unit 12, and the 3D information acquisition unit 12 calculates, for example, depth information regarding the position of each pixel of the image sensing device 4. The 3D information acquisition unit 12 stores the calculated 3D information in the 3D information memory unit 13.

In S1105, the system control unit 3 determines a subject region in the photographed image. For example, the user may determine a subject region for shaping by using the subject selection unit 8, or the system control unit 3 may extract the contour of the subject focused in the photographed image to determine the subject region. The user may also select a subject for shaping a 3D object from a plurality of subjects contours of which are extracted, by using the subject selection unit 8. As long as a subject region in the photographed image is designated, any method other than those described above may be used.

In S1106, the system control unit 3 determines the shaping magnification. The shaping magnification may be determined by the user by using the shaping magnification input unit 10 as described with reference to FIGS. 8A and 8B. The shaping magnification may also be determined automatically when the system of the camera 1 is started up or when the subject is determined in S1105. The automatic determination is performed based on, for example, the actual subject size and the maximum shaping size set for a used shaping device.

In S1107, the system control unit 3 generates a shaping resolution display image to be displayed on the display unit 14. The shaping resolution display image is, for example, an image notifying the user of a shaping resolution, such as the display scale 72 indicating the shaping resolution described with reference to FIGS. 7A and 7B. The shaping resolution display image is not limited to that described above. As long as a shaping resolution for the subject is made known from a display image, the display image may be used. The system control unit 3 generates the shaping resolution display image on the basis of the input shaping device resolution, the determined shaping magnification, and the acquired 3D information. For example, the system control unit 3 calculates the life-size of the subject by using the acquired 3D information and generates the display scale 72 indicating the shaping resolution consistent with the subject size. If the shaping magnification k is not 1, the system control unit 3 generates the display scale 72 in which the divisions to be displayed in accordance with the shaping magnification are arranged at a changed pitch. If the enlargement display 74 is to be displayed, the system control unit 3 generates an enlarged image depicting an enlarged part of the subject region and the display scale 72 appropriate for the enlargement ratio of the enlarged image. The system control unit 3 superposes the generated display scale 72 on the photographed image or the enlarged image and outputs the image as a shaping resolution display image.

In S1108, the system control unit 3 displays the shaping resolution display image generated in S1107 on the display unit 14.

In S1109, the system control unit 3 determines whether to change the shaping resolution display image. For example, if the system control unit 3 detects an instruction for changing the shaping resolution or the shaping magnification that is input by the user by using the shaping resolution input unit 9 or the shaping magnification input unit 10, the system control unit 3 determines that the shaping resolution display image is to be changed. Alternatively, the system control unit 3 may automatically determine whether to change the shaping resolution display image, for example, by automatically selecting such a shaping resolution that enables acquired details to be sufficiently reproduced based on the acquired 3D information. If the shaping resolution display image is to be changed, the system control unit 3 moves the process to S1110. If the shaping resolution display image is not to be changed, the system control unit 3 moves the process to S1112.

In S1110, the system control unit 3 changes the shaping resolution and stores a new shaping resolution in the shaping resolution memory unit 11. In S1111, the system control unit 3 changes the shaping magnification in the same step as in S1106 and moves the process back to S1107.

In S1112, the system control unit 3 determines whether to perform rephotographing. For example, if the acquired resolution in the acquired 3D information is coarse relative to the shaping resolution, the system control unit 3 determines that rephotographing is to be performed for acquiring more pieces of 3D information. Alternatively, if the user performs a user operation of a rephotographing instruction by using, for example, the input unit 7 (to acquire better 3D information), the system control unit 3 determines that rephotographing is to be performed. If the system control unit 3 determines that rephotographing is to be performed, the system control unit 3 moves the process back to S1104. If the system control unit 3 determines that rephotographing is not to be performed, the system control unit 3 terminates the series of operations in the process.

According to the exemplary embodiment as described above, 3D subject-information and a shaping resolution of a shaping device that shapes the subject are acquired, and the shaping resolution is displayed in a captured image including the subject. In particular, the display scale 72 added to the photographed image is displayed, and an index indicating the magnitude of the shaping resolution is thus displayed to enable comparison with the size of the subject. This enables the user to know how the shaping resolution is applied to the subject, that is, the influence of the shaping resolution. In addition, the user verifies the display of the shaping resolution and can thereby verify, at the time of photographing, whether a used shaping device can reproduce a desired shape. Accordingly, the user can determine whether to further perform photographing to acquire desired 3D information. This enables assistance in generating desired 3D information for shaping an object.

The exemplary embodiment of the disclosure enables assistance in generating desired 3D information for shaping an object.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of priority from Japanese Patent Application No. 2015-218792, filed Nov. 6, 2015, which is hereby incorporated by reference herein in its entirety.

What is claimed is:

1. An image capturing apparatus comprising:
an image sensing device which receives light beams from an imaging optical system;
one or more processors; and
a memory storing instructions which, when the instructions are executed by the one or more processors, cause an image processing apparatus to
acquire an image using the image sensing device and three-dimensional information regarding a subject in the image, the three-dimensional information including depth information regarding the image,
determine an image resolution indicating a resolution of the image based on the three-dimensional information regarding the subject;
acquire a shaping device resolution indicating a resolution used by a shaping device to shape an object in a three-dimensional shape of the subject, and
display the shaping device resolution on the image as a relationship between a size of the subject in the acquired image and magnitude of the shaping device resolution,
thereby enabling a user to compare the subject in the image with the shaping device resolution, and determine whether the image resolution is coarser than, equal to, or more precise than the shaping device resolution, and
wherein the image resolution is determined based on a focal length of the imaging optical system when the image is captured using the imaging sensing device.

2. The image capturing apparatus according to claim 1, wherein the image processing apparatus further displays an index indicating the magnitude of the shaping device resolution to allow comparison with the size of the subject in the acquired image.

3. The image capturing apparatus according to claim 2, wherein the image processing apparatus further displays a portion of the subject and the index indicating the magnitude of the shaping device resolution to allow comparison with a size of the portion of the subject.

4. The image capturing apparatus according to claim 2, wherein the image processing apparatus further displays, in a region for at least a portion of the subject, information indicating the three-dimensional shape of the subject based on the three-dimensional information regarding the subject and displays the index indicating the magnitude of the shaping device resolution to allow comparison with a size of the at least portion of the subject.

5. The image capturing apparatus according to claim 2, wherein the image processing apparatus further displays the index indicating the magnitude of the shaping device resolution in consideration of a shaping magnification indicating a size of the subject that is expected in shaping performed by the shaping device relative to an actual size of the subject.

6. The image capturing apparatus according to claim 5, wherein the shaping magnification is determined based on the actual size of the subject and a maximum size usable for the shaping performed by the shaping device.

7. The image capturing apparatus according to claim 2, wherein the index indicating the magnitude of the shaping device resolution includes divisions indicating the magnitude of the shaping device resolution.

8. The image capturing apparatus according to claim 1, wherein the shaping device resolution is determined based on a positional resolution of a shaping head that discharges a material of the object to be shaped by the shaping device and on a diameter of a nozzle through which the shaping head discharges the material of the object.

9. The image capturing apparatus according to claim 1, wherein the image processing apparatus further acquires the shaping device resolution of the shaping device selected by a user.

10. The image capturing apparatus according to claim 1, wherein the image processing apparatus further
communicates with the shaping device, and
acquires the shaping device resolution of the shaping device.

11. The image capturing apparatus according to claim 1, wherein the image sensing device has a plurality of pixels each including a plurality of photoelectric conversion areas, and
wherein the three-dimensional information includes the image acquired based on parallax images and the depth information regarding the image acquired based on the parallax images, the parallax images being acquired at a single time when exposure to the image sensing device is performed.

12. An image capturing apparatus control method for controlling an image capturing apparatus including an image sensing device which receives light beams from an imaging optical system, the method comprising:
first acquiring an image by using the image sensing device and three-dimensional information regarding a subject in the image, the three-dimensional information including depth information regarding the image,
determining an image resolution indicating a resolution of the image based on the three-dimensional information regarding the subject;
second acquiring a shaping device resolution indicating a resolution used by a shaping device to shape an object in a three-dimensional shape of the subject, and
displaying the shaping device resolution of the shaping device on the image as a relationship between a size of the subject in the acquired image and magnitude of the shaping device resolution of the shaping device,
thereby enabling a user to compare the image with the shaping device resolution, and determine whether the image resolution is coarser than, equal to, or more precise than the shaping device resolution, and
wherein the image resolution is determined based on a focal length of the imaging optical system when the image is captured using the imaging sensing device.

13. A non-transitory computer readable medium storing a program for causing a computer to execute an image capturing apparatus control method, the method comprising:
first acquiring an image by using an image sensing device which receives light beams from an imaging optical system, and three-dimensional information regarding a subject in the image, the three-dimensional information including depth information regarding the image,
determining an image resolution indicating a resolution of the image based on the three-dimensional information regarding the subject;
second acquiring a shaping device resolution indicating a resolution used by a shaping device to shape an object in a three-dimensional shape of the subject, and
display the shaping device resolution on the image as a relationship between a size of the subject in the acquired image and magnitude of the shaping device resolution of the shaping device,
thereby enabling a user to compare the image resolution with the shaping device resolution, and determine whether the image resolution is coarser than, equal to, or more precise than the shaping device resolution, and
wherein the image resolution is determined based on a focal length of the imaging optical system when the image is captured using the imaging sensing device.

* * * * *